United States Patent Office 2,810,751
Patented Oct. 22, 1957

2,810,751

RECOVERY OF GLUTAMIC ACID

Edward Segel, Chicago, and Jacob Heerema, Oak Park, Ill., assignors to Corn Products Refining Company, New York, N. Y., a corporation of New Jersey No Drawing. Application May 20, 1955, Serial No. 510,044

4 Claims. (Cl. 260—529)

This invention relates to the recovery of glutamic acid from protein hydrolyzates and particularly from the hydrolyzates of glutens.

Prior art processes for making and recovering glutamic acid from proteinaceous materials, such as glutens, involve hydrolysis with acid under appropriate conditions. The resultant hydrolyzate, which contains the individual amino acids in acidic solution, is treated in various ways to recover therefrom individual amino acids or mixtures thereof. For example, tyrosine and leucine may be removed by adjusting the pH of the hydrolyzate to about 4 to 7 and, after removal of insoluble impurities, concentrating the resultant solution beyond the saturation point of tyrosine and leucine. After these have been removed, the pH of the remaining solution is adjusted to a pH of about 3.2, the isoelectric point of glutamic acid, at which direct crystallization of glutamic acid is possible.

None of the prior art processes, however, produce an ash-free glutamic acid without resort to long, complicated and expensive processing. When hydrochloric acid is used as the hydrolyzing agent, a sodium base is generally used as the neutralizing agent. Resultant sodium chloride is not an objectionable contaminant of glutamic acid but it may be in the mother liquor from which glutamic acid crystallizes. Further there are problems of corrosion involved in the use of hydrochloric acid. Sulfuric acid is a cheaper and less corrosive agent to handle than hydrochloric acid but the obvious by-products of its use, i. e., sodium sulfate and calcium sulfate, are objectionable contaminants of glutamic acid and, in addition, the former contaminates the mother liquor aforementioned.

It is an object of this invention to provide a novel process for making and recovering glutamic acid from glutens. Another object is to recover from gluten hydrolyzates glutamic acid which is substantially free of ash and transformable simply, and in high yields, to monosodium glutamate. A further object is to recover glutamic acid in high yields and high degree of purity from sulfuric acid hydrolyzates of glutens. Other objects will appear hereinafter.

We have discovered that glutamic acid may be recovered in good yields and in a high degree of purity from a sulfuric acid hydrolyzate of gluten by carrying out a novel deashing step under critically controlled conditions.

When lime is used to adjust the pH of a sulfuric acid hydrolyzate of gluten to about 4 to 7 for the removal of leucine and tyrosine, the major portion of the resultant calcium sulfate can be removed readily, as by filtrations, but the remaining calcium sulfate, as well as calcium combined with amino acids, is removed with great difficulty, if at all. Generally, it crystallizes later with the glutamic acid. We have discovered that the calcium sulfate remaining in the final concentrate containing the glutamic acid may be conditioned for easy removal by first adjusting the pH of the concentrate to 2.8 to 3.5 (preferably 3.2) with sulfuric acid and then rapidly heating the liquor to 65 to 100° C. (preferably at about 80° C.) and maintaining it at this temperature for 5 to 30 minutes (preferably about 15 minutes at 80° C.). An optional and useful step in the process is the addition of decolorizing carbon after the adjustment of the pH and prior to the heat treatment. After the heat treatment, the hot liquor should be filtered immediately, the filtrate cooled and glutamic acid allowed to crystallize. The heat treatment described conditions the calcium sulfate for easy removal, and at the same time, prevents crystallization of glutamic acid which otherwise might be removed and lost at this point. The addition of decolorizing carbon at the point indicated appears to promote subsequent crystallization of glutamic acid, in addition to a very desirable action in color removal. The crystals of glutamic acid are larger and more uniform and more easily filtered than when the carbon treatment is omitted.

By means of our invention, it is possible to recover in a single crystallization glutamic acid of a purity of 94 to 98 percent and higher and with an ash content as low as 0.04 percent. This is a distinct advantage over prior art processes which result in ash contents ordinarily of 4 to 7 percent. Thus it will be obvious that our invention represents a great advance over the prior art as it makes available for the first time the advantages of sulfuric acid as a hydrolyzing agent for proteins without the disadvantages of the problem of removing insoluble ash from glutamic acid.

The following examples will further illustrate the invention. They are typical and representative and are not intended to limit the invention in any way.

*Example 1*

Destarched grain sorghum gluten (78 percent protein as is, 85 percent protein, dry basis) in the amount of 2950 g. was charged to an autoclave with 6370 ml. water and 1935 ml. concentrated sulfuric acid. A temperature of 127° C. was maintained under agitation for 5 hours. The contents were cooled and a slurry of hydrated lime was added under agitation with further cooling until a stable pH of 5.6 (5.0 to 6.5) was obtained at 50° C. The mixture at a volume of 17,000 ml. was directly filtered and the cake was washed on the filter with 9500 ml. water at 80 to 90° C.

The combined filtered liquors were evaporated at 40° C. to 7000 ml. Insoluble amino acids were filtered off and the cake washed. The filtrate and washings were evaporated to 5000 ml. and additional insoluble amino acids were removed. Filtrate and washings were adjusted to pH 3.2 with 200 ml. concentrated sulfuric acid and 36 g. activated vegetable carbon (sold under the trademark Darco KB) was added. The solution was heated to 80° C., held for 15 minutes, and filtered directly. The filter cake was reslurried twice with 100 ml. portions of hot water (70 to 80° C.).

Combined filtrates at 60° C. were slowly cooled (4 to 7° C.) under agitation for 5 days. The crystalline glutamic acid was filtered off and washed successively with 500 and 100 ml. portions of ice water. The product dried at 85° C. weighed 412 g. The purity or glutamic acid content was 97 percent; ash was 0.04 percent. When the glutamic acid was added to a solution of sodium hydroxide, a solution of monosodium glutamate was obtained which was clear, indicating the low ash content.

When the above procedure was repeated without the addition of carbon at the point indicated, the purity and ash content were substantially the same but the crystals were larger and more uniform and the filtration time for filtering the glutamic acid crystals was cut in half.

*Example 2*

Grain sorghum gluten (69 percent protein, dry basis) was processed in a similar manner to give 0.154 lb. glutamic acid per pound of initial protein. The purity of the product was 94 percent, the ash content 0.3 percent.

*Example 3*

Wheat gluten (79 percent protein, as is) was processed in a similar manner to give 0.255 lb. glutamic acid per pound of initial protein. The purity of the glutamic acid was 94.5 percent, the ash content 0.23 percent.

*Example 4*

A sulfuric acid hydrolyzate of corn gluten (70 percent protein) was freed of insoluble amino acids and interfering calcium sulfate at pH 5.6 (5.0 to 6.5). The resulting glutamic acid concentrate was acidified with sulfuric acid to pH 3.2 and heated to 90° C. during which solid precipitated and was filtered off hot. The filtrate, on cooling, gave crystalline glutamic acid of 93 percent purity and 0.04 per cent ash. A control run omitting the heating and filtering step at pH 3.2 gave glutamic acid of 7.7 percent ash content.

*Example 5*

A grain sorghum gluten hydrolyzate was obtained and treated, as in Example 1, except that acidification to pH 3.2 was carried out at 45° C., and then the acidified liquor was immediately heated to 80° C. and maintained at this temperature for 15 minutes and then filtered. The filtrate was cooled and held at 10° C. for 3 days to allow glutamic acid to crystallize. The ash content of the glutamic acid in two runs was 0.14 and 0.16 percent. In two runs without heat treatment the ash content was 3.6 and 5.0 percent.

We claim:

1. In a process for recovering glutamic acid from sulfuric acid hydrolyzates of proteinaceous materials which comprises adjusting the pH of the hydrolyzate to 4 to 7 with lime, removing insolubles, concentrating the resultant liquor and removing insolubles, the improvement which comprises adjusting the pH of the concentrated liquor remaining after removal of last mentioned insolubles to 2.8 to 3.5 with sulfuric acid and quickly heating the acidified liquor to 65 to 100° C. and maintaining such temperature for 5 to 30 minutes, immediately separating insoluble materials from the heated liquor, cooling the liquor and crystallizing and separating therefrom glutamic acid.

2. A process for recovering glutamic acid from gluten which comprises hydrolyzing the gluten with sulfuric acid, cooling the hydrolyzate and adjusting the pH thereof to 5 to 6.5 with lime, filtering the mixture, concentrating the filtrate, filtering the concentrated liquor, adjusting the pH of the filtered liquor to about 3.2 with sulfuric acid, quickly heating the acidified liquor to 65 to 100° C. and maintaining said temperature range for 5 to 30 minutes, immediately separating insoluble materials from the heated liquor, cooling the liquor and crystallizing and separating therefrom glutamic acid.

3. In a process for recovering glutamic acid from sulfuric acid hydrolyzates of proteinaceous materials which comprises adjusting the pH of the hydrolyzate to 4 to 7 with lime, removing insolubles, concentrating the resultant liquor and removing insolubles, the improvement which comprises adjusting the pH of the concentrated liquor remaining after removal of last mentioned insolubles to 2.8 to 3.5 with sulfuric acid, adding activated vegetable carbon and quickly heating the acidified liquor to 65 to 100° C. and maintaining such temperature for 5 to 30 minutes, immediately separating insoluble materials from the heated liquor, cooling the liquor and crystallizing and separating therefrom glutamic acid.

4. A process for recovering glutamic acid from gluten which comprises hydrolyzing the gluten with sulfuric acid, cooling the hydrolyzate and adjusting the pH thereof to 5 to 6.5 with lime, filtering the mixture, concentrating the filtrate, filtering the concentrated liquor, adjusting the pH of the filtered liquor to about 3.2 with sulfuric acid, adding activated vegetable carbon, quickly heating the acidified liquor to 65 to 100° C. and maintaining said temperature range for 5 to 30 minutes, immediately separating insoluble materials from the heated liquor, cooling the liquor and crystallizing and separating therefrom glutamic acid.

References Cited in the file of this patent

UNITED STATES PATENTS

| | | |
|---|---|---|
| 2,505,129 | Manning | Apr. 25, 1950 |
| 2,598,341 | Blish | May 27, 1952 |
| 2,688,037 | Hoglan | Aug. 31, 1954 |